UNITED STATES PATENT OFFICE.

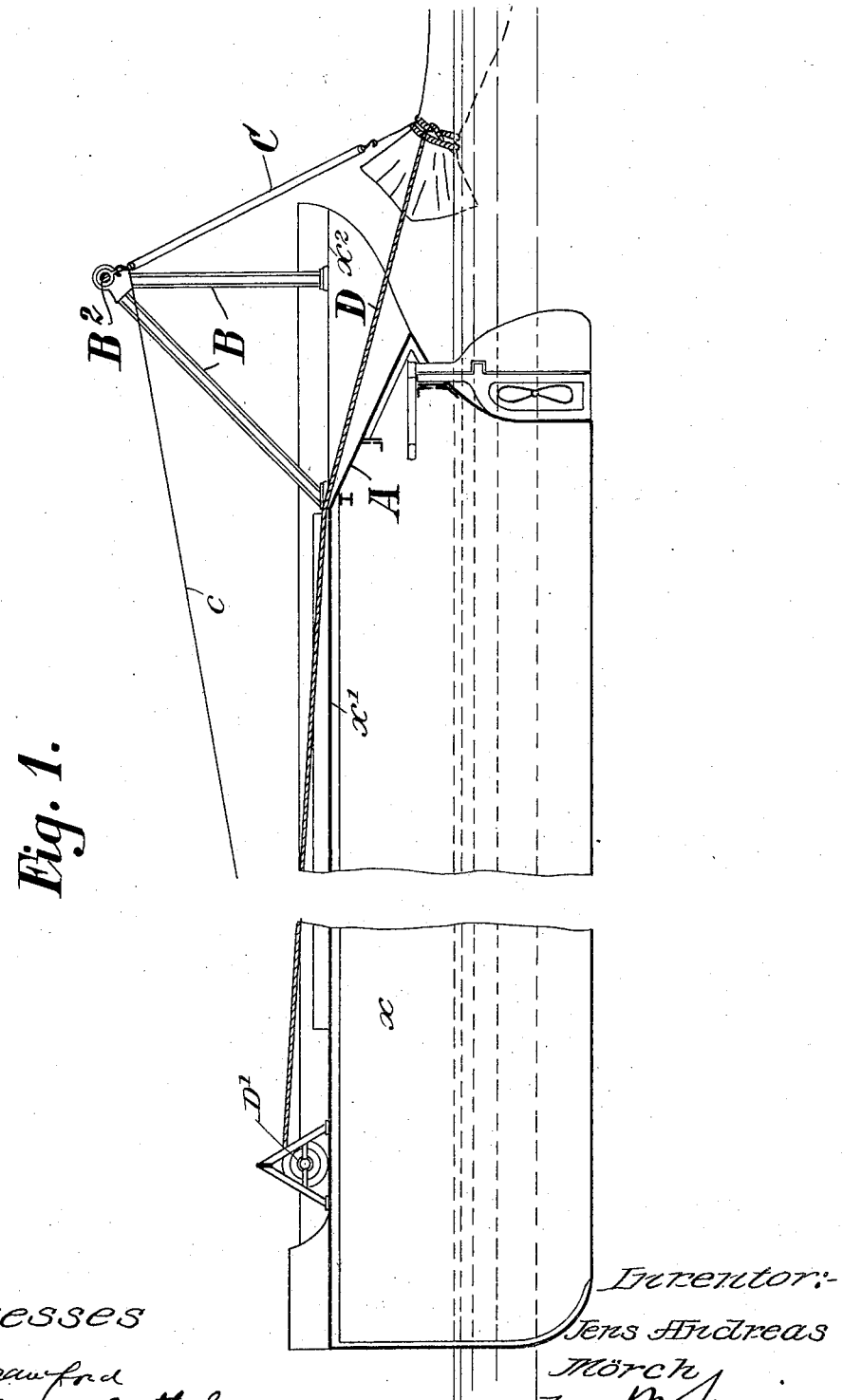

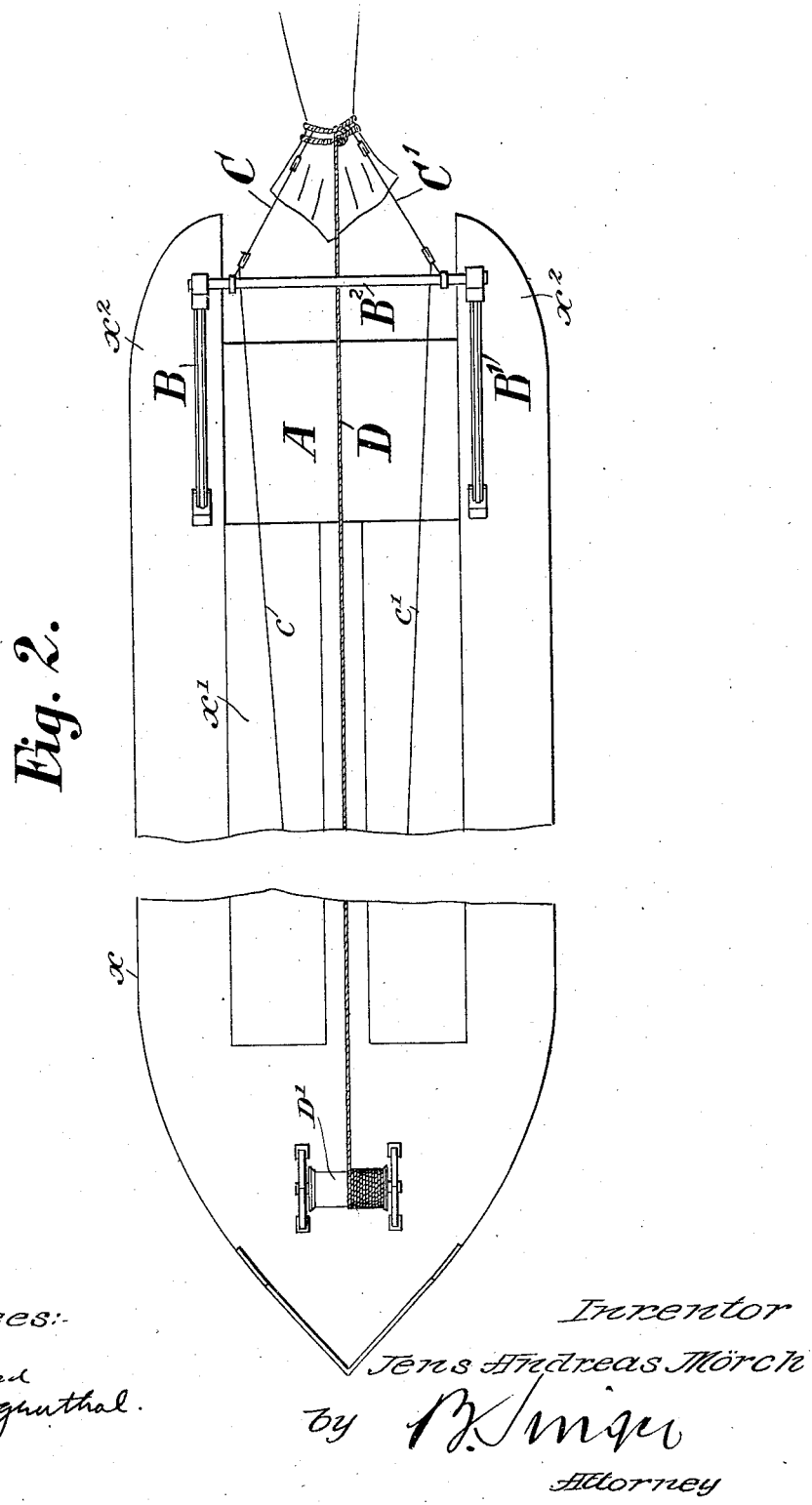

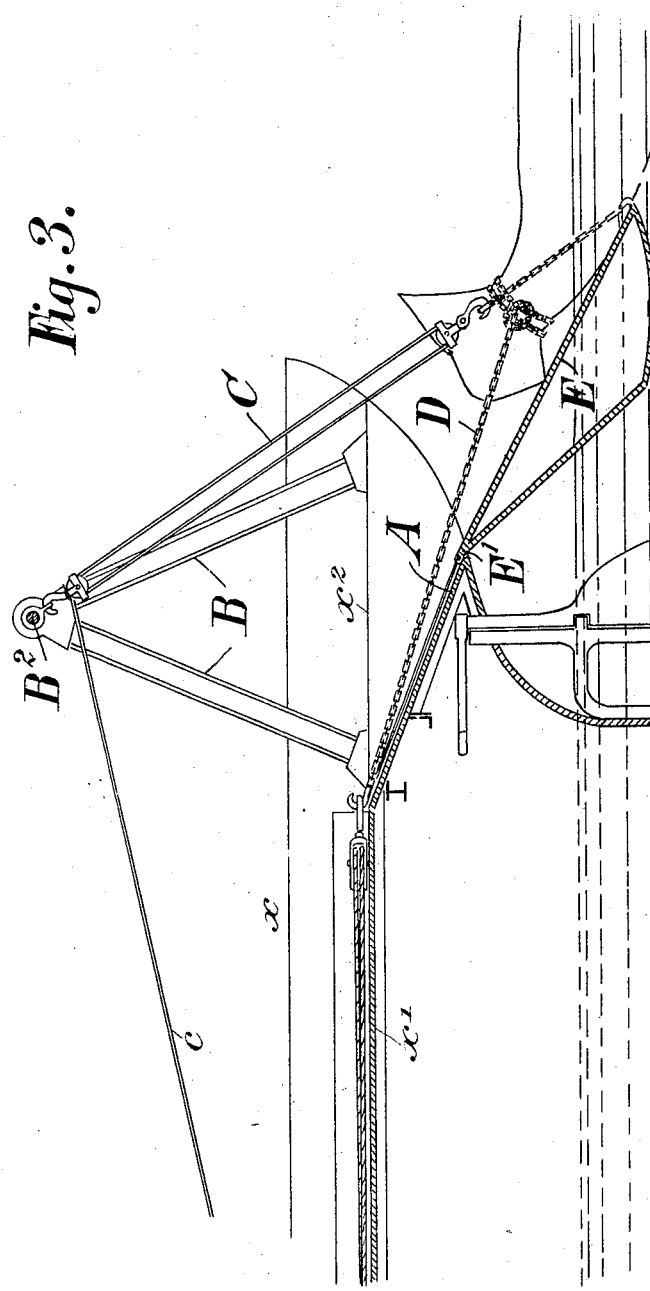

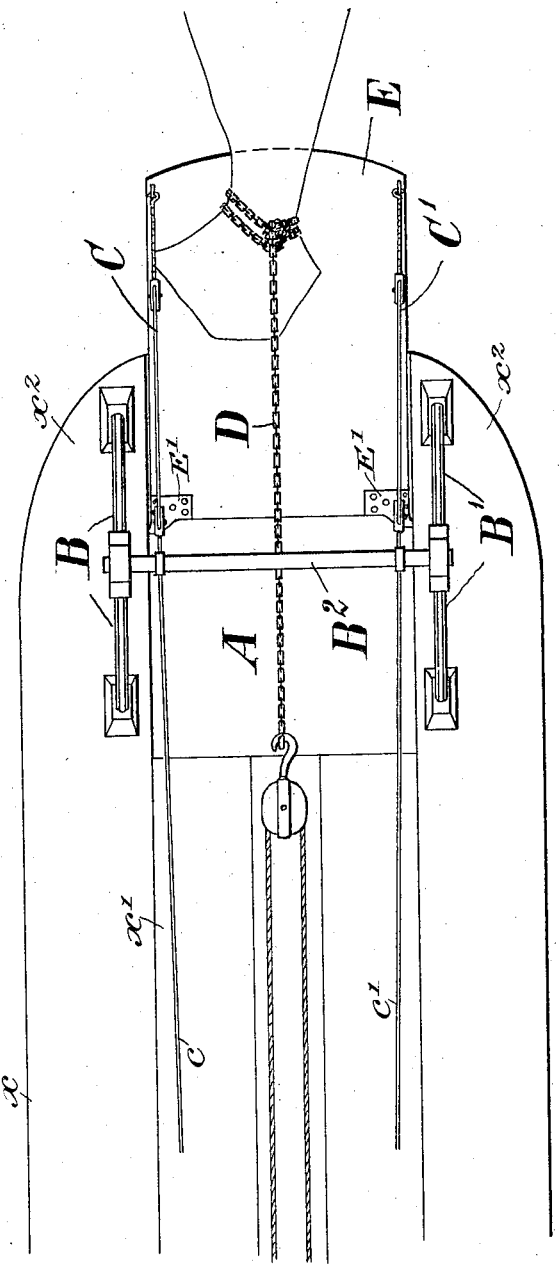

JENS ANDREAS MÖRCH, OF CHRISTIANIA, NORWAY.

VESSEL FOR WHALE-FISHING.

No. 893,642.	Specification of Letters Patent.	Patented July 21, 1908.

Application filed July 22, 1907. Serial No. 385,064.

*To all whom it may concern:*

Be it known that I, JENS ANDREAS MÖRCH, subject of the King of Norway, residing at the city of Christiania, Norway, have invented certain new and useful Improvements in Vessels for Whale-Fishing, of which the following is a specification, reference being had therein to the accompanying drawing.

This invention relates to improvements in and to vessels adapted to be used in the whale fishing industry and has to do more particularly with means for facilitating the loading of dead whales upon the vessels.

In the most improved embodiment of the invention the vessel is provided with a receiving portion and with means adapted for connection with the whale whereby the same when actuated serves to bring the vessel and the whale into positions whereby the loading of the latter is facilitated.

The invention also desirably includes means for loading or drawing the whale into or onto the vessel.

Where the application of my invention is made in connection with a whaling vessel of relatively large size the receiving portion is conveniently provided with extensible means whereby the said receiving portion may be extended toward or to the water level to facilitate the operation of loading the whale upon the vessel.

The invention comprises other features and also details of construction which will be hereinafter more fully explained in connection with the accompanying drawings and which will be more particularly pointed out and ascertained in the appendant claims.

In the drawings:—Figure 1, is a longitudinal sectional view of a vessel equipped with a device embodying the preferred form of my invention. Fig. 2, is a plan view thereof. Fig. 3, is a longitudinal sectional view of a vessel equipped with a modified form of the invention. Fig. 4, is a plan view thereof.

Like characters of reference designate similar parts throughout the different figures of the drawings.

As shown and referring more especially to the form shown in Figs. 1 and 2, the vessel as a whole is indicated by $x$ and is provided with a receiving portion preferably located at the stern and desirably inclined downwardly and rearwardly from the deck $x'$, said portion being indicated by A. Conveniently said inclined receiving portion is relatively reduced with respect to the width of the vessel, as clearly shown in Fig. 2, thereby providing lateral supporting portions $x^2$ for a purpose which will hereinafter more fully appear.

In order to facilitate the operation of loading the whale it is desirable to raise the latter above the level of the water and approximately on a level with the receiving portion so that the body of the whale can be readily slid or drawn upon and over the receiving portion and to more fully realize this feature means are provided which serve not only to raise the whale, or a portion thereof, above the water level but to lower the vessel at that end provided with the receiving portion toward the water level. In the embodiment shown said means is in the form of a hoisting device mounted adjacent the receiving portion and comprises standards B, B' mounted on the supporting portions $x^2$. A block and tackle of usual form is indicated at C, C' as attached to a cross bar $B^2$ secured to the standards B, B' and is adapted for connection with the tail of the whale as shown. The draw ropes $c$, $c'$ of the tackles C, C' are shown extending forwardly and may be anchored in any suitable manner.

It will be seen by reference to Fig. 1, that the hoisting means may not only serve to raise the tail above the water level but that it also serves to maintain the tail portion in a relatively raised position while the same is being drawn toward the vessel.

If desired the hoisting means may be operated while the whale is being drawn toward the vessel so as to take up the slack which would result from drawing the whale from the position shown in Fig. 1, to a position wherein the tail is supported on the inclined receiving portion A.

After the body of the whale has been hoisted into loading position it is necessary to draw the body of the whale onto the deck and to this end means are provided which are adapted to be connected with the whale and as shown said means comprises a windlass D', which may be operated in any suitable manner, and a hawser D operated by said windlass and adapted to be secured to the tail of the whale.

Where the device of my invention is applied to relatively large whaling vessels which cannot be lowered to bring the receiving portion on a level of the water extensible means is provided which as shown consist of a movably mounted member E, which conveniently forms a continuation of the inclined guiding portion A. In order to make the member E, as nearly self sustaining as possible the same is conveniently made in the form of a float as shown in Fig. 3, wherein said member is of hollow construction. The member E is preferably so constructed with reference to the receiving portion A as to completely fill the same when drawn into place, the outer end of the member E having the contour of the stern of the vessel. In this form of the invention the tackles C, C' are connected directly to the member E and the hoisting of the tail of the whale is effected by raising the member E by said tackles into the position shown in Fig. 3. It will be understood that prior to the operation of bringing the whale into position shown in Fig. 3, the member E will be inclined at a greater angle than that shown in said figure and that when the hawser D has been operated to draw the tail into engagement with the member E the latter will be raised into the position shown in said figure. It will thus be seen that while the hoisting means, in this form of the invention, is not adapted for connection with the body of the whale it nevertheless performs substantially the same function as the hoisting means in the preferred construction as it is desirable to raise the member E into a plane coincident with the plane of inclination of the receiving portion A. While the member may be movably connected with the vessel in any suitable manner a slidable connection is preferred and to this end the member E is provided with lugs E' which engages slots or grooves A' formed in the walls of the receiving portion A.

I claim:—

1. In combination, a hull provided with a movable inclined receiving portion located at its stern, a hoisting device mounted on the hull for lowering the inclined portion of the hull substantially to the water level, and means mounted on the hull for drawing a load onto said receiving portion.

2. In combination, a hull provided with a deck and a receiving portion inclined downwardly therefrom, a float extension forming a continuation of said inclined portion, means mounted on said hull for operating said extension for bringing a load into a loading position, and means mounted on the hull for drawing the load over said extension and inclined portion onto said deck.

3. In combination, a hull provided with a deck and having its stern recessed to form a receiving portion inclined downwardly from said deck, an extension proportioned to close and fill said receiving portion when in a non-operating position and adapted to form a continuation of said receiving portion when in an operating position, means mounted on said hull for operating said extension, and means mounted on said hull for drawing a load over said extension and inclined portion onto said deck.

4. In combination, a hull provided with a deck and having its stern recessed to form a receiving portion inclined downwardly from said deck, an extension proportioned to close and fill said receiving portion when in a non-operating position and adapted to form a continuation of said receiving portion when in an operating position, means connecting said extension with said hull to permit sliding and swinging movement of the extension, means mounted on said hull for operating said extension, and means mounted on said hull for drawing a load over said extension and inclined portion onto said deck.

5. In combination, a hull provided with a deck and having a recessed portion forming a receiver inclined downwardly from said deck, a float extension proportioned to close said recessed portion when in a non-operating position and adapted to form an extension or continuation to said receiver when in an operating position, means connecting said float extension with said hull to permit sliding and swinging movement of said extension, means for operating said extension, and means for drawing a load over said extension and receiver onto said deck.

In testimony whereof I affix my signature in presence of two witnesses

JENS ANDREAS MÖRCH.

Witnesses:
 N. G. TANDBERG,
 MICHAEL ALGER.